United States Patent
Storbeck

[11] Patent Number: 5,808,849
[45] Date of Patent: Sep. 15, 1998

[54] METHOD FOR THE PROTECTION IN PARTICULAR OF TELECOMMUNICATION INSTALLATIONS AND PROTECTION CIRCUIT FOR CARRYING OUT THE METHOD

[75] Inventor: Carsten Storbeck, Berlin, Germany

[73] Assignee: Krone Aktiengesellschaft, Berlin-Zehlendorf, Germany

[21] Appl. No.: 822,363

[22] Filed: Mar. 20, 1997

Related U.S. Application Data

[63] Continuation of Ser. No. 470,070, Jun. 6, 1995, abandoned.

[30] Foreign Application Priority Data

Jul. 1, 1994 [DE] Germany .................. 44 23 798.7

[51] Int. Cl.⁶ ....................................... H02H 1/00
[52] U.S. Cl. ............................. 361/119; 361/120
[58] Field of Search ................ 361/56, 91, 111, 361/118, 119, 120, 126, 127

[56] References Cited

U.S. PATENT DOCUMENTS

| | | | |
|---|---|---|---|
| 4,586,104 | 4/1986 | Standler | 361/91 |
| 4,758,920 | 7/1988 | McCartney | 361/119 |
| 4,907,120 | 3/1990 | Maczmarek et al. | 361/119 |
| 4,964,160 | 10/1990 | Traube et al. | 361/119 |
| 5,677,820 | 10/1997 | Pelegris | 361/119 |

FOREIGN PATENT DOCUMENTS

| | | | |
|---|---|---|---|
| 0 471 167 A1 | 8/1990 | European Pat. Off. | H01T 1/14 |
| 2 160 721 | 12/1985 | United Kingdom | H02M 9/00 |

*Primary Examiner*—Ronald W. Leja
*Attorney, Agent, or Firm*—McGlew and Tuttle

[57] ABSTRACT

A method for the protection of in particular telecommunication installations against overvoltage and overcurrent by overvoltage arresters, PTC resistors and voltage-limiting components and to a protection circuit for carrying-out the method. The object of the invention, namely to develop a method and a circuit in particular for the protection of telecommunication installations against overvoltage and overcurrent that secures a surge-current resistant and reversible line protection, is achieved by the response voltage of the overvoltage arrester being higher than the peak value of a powersupply voltage, and that the response voltage of the thyristor diodes selected being slightly above the maximum operating voltage values of the line to be protected. The PTC resistors are used as a decoupling member to block the maximum amplitudes of the power supply voltage.

15 Claims, 1 Drawing Sheet

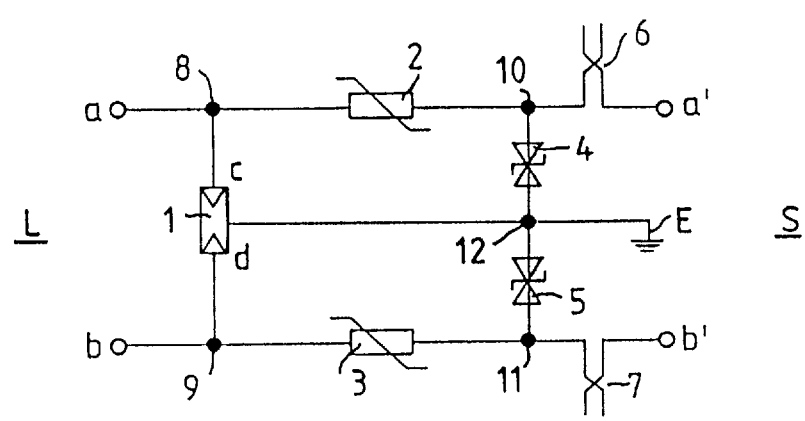

METHOD FOR THE PROTECTION IN PARTICULAR OF TELECOMMUNICATION INSTALLATIONS AND PROTECTION CIRCUIT FOR CARRYING OUT THE METHOD

This is a continuation application of application Ser. No. 08/470,070 filed Jun. 6, 1995 now abandoned.

FIELD OF THE INVENTION

The present invention relates to a method for the protection of telecommunication installations against overvoltage and overcurrent occurrences using overvoltage arresters, PTC resistors and voltage-limiting components.

BACKGROUND OF THE INVENTION

If between a telephone or data line and a power supply line, e.g. 220 V main (or other main power supply values), a shortcircuit occurs, after the response of an overvoltage suppressor having a d.c. response voltage of ±230 V a response of the fail-safe contact and thus a short of the overvoltage suppressor (power crossing) will take place within seconds. The now flowing shortcircuit current is permanently carried off to ground (earth). Since the existing disturbance is not eliminated thereby, but may continue to exist for a period of time, the requirement is to disconnect these in part inadmissibly high permanent currents which may lead to a destruction of the respective line cables.

Generally line protection devices are provided for this purpose that are disposed, according to prior art circuits (KRONE brochure "ComProtect 2/1 CP DX 180A1", 8/1993), upstream of the overvoltage suppressor in order to disconnect the shortcircuit current. As the most important function of overvoltage suppressors is to repeatedly suppress surge currents in the order of 5 kA and the described line protection device has previously been arranged upstream the overvoltage suppressor, this requirement of disconnection could only be met by very expensive special protection devices.

Suitable protection is possible with the devices as described, e.g., in the protection device catalogue distributed by Cehess, 94533 Rungis Cedex (France). These protection devices can be employed as line protection devices resistant to surge currents. The disadvantage is the ageing behavior of the protection devices. For the corresponding surge current loads, the life of the protection device is correspondingly limited. Further, the protection device is not reversible.

In DE 40 26 004 C2, a protection circuit for telecommunication installations is described, wherein the cross path of the overvoltage suppressor is disposed upstream of the protection device, whereas between the line connection and the ground (earth) conductor a shortcircuit cross path downstream of the protection device is disposed. When the protection element responds, the cross path of the overvoltage suppressor opens and closes the shortcircuit cross path (fail-safe), so that the protection devices respond and the lines are disconnected. By this measure, commercial protection devices can be used as line protection devices, since the particular position thereof does not require resistance against surge currents. It is disadvantageous, however, that after response of the line protection device the complete protection element plug has to be replaced.

SUMMARY AND OBJECTS OF THE INVENTION

It is therefore the object of the invention to develop a method and a circuit in particular for the protection of telecommunication installations against overvoltage and overcurrent that secures a surge-current resistant and reversible line protection.

This object is attained by a method for the protection of telecommunication installations against overvoltage and overcurrent by employing overvoltage arresters, PTC resistors and voltage-limiting components. The response voltage of the overvoltage arrester is set higher than the peak value of a power supply voltage which could short to the protected communication line. The response voltage of thyristor diodes (voltage limiting component) is selected slightly above the maximum operating voltage values of the communication line to be protected. The PTC resistors are used as a decoupling member and block the maximum amplitudes of the power supply voltage shortable to the communication line. According to the invention, a protection circuit for carrying-out the method is provided. PTC resistors are included in the associated line connections. Each PTC resistor is connected, with regard to the direction line side-system (or subscriber) side, upstream of the voltage-limiting component. The overvoltage arrester is connected, with regard to the direction line side-system (or subscriber) side, as a cross path upstream of the PTC resistors and has together with the voltage-limiting components, connected in parallel to the overvoltage arrester, a common ground (earth) line.

By matching the response d.c. voltage of the overvoltage suppressor with regard to the PTC resistors and the bidirectional thyristor diodes (thyristor diodes are "crowbar type protection diodes", semiconductor components with two conduction states similar to thyristors or triacs, e.g. the TRISIL diodes of SGS-Thomson Microelectronics in "PROTECTION DEVICES", Databook, 2nd edition, March 1993, p. 311) such that the response voltage is higher than the peak value of an a.c. load of e.g. 230 Veff, i.e. peak values ≧325 V, and that the response voltage of the thyristor diodes is selected slightly above the maximum operating voltage values normally occurring in the telecommunication, e.g. 180 V, as well as by the selection of the PTC resistors as a decoupling member, any desired resistances against surge currents and a reversible function for a line protection device are obtained.

The functions of line protection devices and device protection devices are taken here by one component, namely the standard PTC resistors. An arbitrary number of surge current loads does not cause ageing. After elimination of a disturbance, the circuit can immediately be re-used. Simultaneously, the protection circuit secures that it can be integrated in existing designs of protection plugs. It can be implemented in a cost-effective way by standard components. Additional functions of a protection plug are not limited.

The protection circuit does not require a fail-safe contact for the protection from inadmissibly high heat generation. Such a fail-safe contact has been required up to now. This has lead to the requirement that after its response, the complete protection plug has to be replaced. The protection circuit according to the invention, however, protects without fail-safe contact with regard to infinitely long existing a.c. loads of 230 Veff and is reversible and fully maintenance-free. The application of thyristor diodes as the second stage of voltage-limiting diodes (fine-protection device), in particular solid-state thyristor diodes, ensure an extremely quick response and a low protection level for static and dynamic voltage increases. It combines the advantages of an overvoltage suppressor (coarse-protection device) and solid-state components in a protection device.

The application of the PTC resistors further ensures a reversible current protection even for voltages not leading to a response of the overvoltage suppressor nor of the diodes (function device protection). Thus, two protection functions are fulfilled by one component, line and device protection. The method preferably further includes selecting(setting) the response voltage of the overvoltage arrester to be higher than an a.c. load of Veff (230 V) and that the PTC resistors block the maximum amplitudes of the power supply voltage of 230 Veff from reaching the subscriber side).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The sole FIGURE (FIG. 1) shows a circuit diagram of a protection circuit according to the invention.

DETAILED DESCRIPTION OF THE PREFERRED EMBODIMENT

Referring to the drawing in particular, FIG. 1 shows a protection circuit connected in the currents paths or communication lines a–a' (first current path) and b–b' (second current path). A common ground (earth) line E serves for carrying off overcurrents generated by overvoltages. On the disturbance side, main side or lineside L, the probable source of disturbances, an overvoltage suppressor 1, e.g. having a response d.c. voltage of 440 to 660 V, is disposed as a cross path c-d between the current paths a–a' and b–b'. At the branching to the overvoltage arrester 1, the common ground (earth) line E is connected. The PTC resistors 2, 3 are included in the lines a–a' or b–b', respectively, downstream of the branchings 8, 9 of the overvoltage arrester 1. The PTC resistors 2, 3, are e.g. 20 ohms. The solid-state thyristor diodes 4, 5 have a response voltage of e.g. 200 V and are connected downstream from the branchings 8, 9 as another cross path in parallel to the overvoltage arrester 1. The thyristor diodes are connected by the branching 12 to the common ground (earth) line E. On the side to be protected or system (or subscriber) side, measuring and disconnecting positions 6, 7 are connected in the lines a–a' and b–b'. The arrangement of measuring and disconnecting positions 6, 7 downstream of the protection device forming a series protection device of coarse, fine and current protection, permits a partial function check of the line.

The components of the protection device have to be matched as a surge-current resistant and reversible line protection device. The response voltage of the overvoltage suppressor 1, a 3-pole suppressor can be used which actually contains two separate overvoltage arrestors, has to be selected, e.g., that it is higher than the peak or maximum value of an a.c. voltage load accidentally shortable to the communication line. Here, an overvoltage suppressor 1 having a response voltage of >440 V has been selected.

The thyristor diodes 4, 5 are selected such that their response voltage is slightly above the maximum operating voltage values generally occurring in the telecommunication applications, e.g. 180 V.

The PTC resistors 2, 3 are selected such that they act as a decoupling member and can block a maximum a.c. voltage of e.g. 240 Veff. The maximum switching current for the PTC resistors 2, 3 is to be selected as high as possible.

In case of a transient current load, the thyristor diodes 4, 5 limit at the output a',-b' of the system (or subscriber)side S the occurring overvoltage very quickly to a protection level of e.g. ±250 V. Within a short time, the overvoltage suppressor 1 absorbs by the decoupling over the PTC resistors 2, 3 the remaining disturbance energy and carries it off over the ground (earth) line E. The temperature-dependent PTC resistors 2, 3 in the longitudinal branches a–a' or b–b', respectively, implement on the one hand, by their ohmic resistance, the decoupling between coarse and fine protection and act on the other hand as a reversible current-limiting component. If the feature "reversible" is not of importance, "standard" fuses can also be used instead of PTC resistors. Surge currents in the order of e.g. 5 kA are solely absorbed by the overvoltage suppressor 1 and are carried off over the ground (earth) line E.

If, however, an a.c. load (continuous or static overvoltage) of e.g. 230 Veff/5 Aeff is shorted to the communication line, the voltage will not reach the value of the response d.c. voltage of the overvoltage suppressor 1. In this case, the overvoltage suppressor 1 is not required as a component for all a.c. voltage loads of 230 Veff. The thyristor diodes 4, 5, far better suited for this voltage load, absorb the load and limit the voltage. By the substantially lower conducting state voltage of thyristor diodes, generally 2 to 3 V, the power consumption and thus the heat development is clearly lower than for overvoltage suppressors. For a.c. voltage loads of up to 230 Veff thus a response of the fail-safe contact of the overvoltage suppressor 1 can no longer take place. For all a.c. voltage loads of up to 230 Veff therefore a provision of a fail-safe contact at the overvoltage suppressor 1 is not required. Consequently, the protection plug need not be replaced anymore after a 230 Veff a.c. voltage load. An inadmissibly high heat development at the thyristor diodes 4, 5 is excluded by a proper selection of the PTC resistors 2, 3.

The position of the PTC resistors 2, 3 upstream the respective voltage-limiting component, here the thyristor diodes 4, 5, has the effect that the PTC resistors 2, 3 accept the functions of reversible and surge-current resistant line protection devices. Depending on the selected switching current of the PTC resistors 2, 3, the shortcircuit currents flowing at each half wave through the thyristor diodes 4, 5 are interrupted according to a characteristic t=f(i). The PTC resistors 2, 3 obtain a high impedance and prevent thus the inadmissibly high shortcircuit current that would flow off over the telecommunication cables and the thyristor diodes 4, 5 over the ground (earth) line E.

After elimination of the disturbance the circuit is immediately operable again.

In total, the combination according to the invention of the overvoltage suppressor 1 with the solidstate thyristor diodes 4, 5 and by the matching according to the invention of the rated response d.c. voltage of the overvoltage suppressor 1 with the functions of the remaining components results in:

the advantages of overvoltage suppressors and solid-state thyristor diodes combined in a protection plug;

the functions of line protection and device protection are fulfilled by one component, the standard PTC resistors 2, 3;

the 5 kA surge-current resistance is achieved by the overvoltage suppressor 1;

a reversible current protection is secured by the PTC resistors 2, 3 even for voltages that will not make the overvoltage suppressor 1 nor the diodes 4, 5 respond the same standard PTC resistor 2, 3 can be used as a surge-current resistant and reversible line protection device, in case of a shortcircuit from a telecommunication line to a power supply line with 230 Veff, the fail-safe contact of the overvoltage suppressor 1 will not respond;

a reversible and thus widely maintenance-free protection concept is obtained;

the application of the protection circuit is possible also in prior art protection plug housings.

While a specific embodiment of the invention has been shown and described in detail to illustrate the application of the principles of the invention, it will be understood that the invention may be embodied otherwise without departing from such principles.

What is claimed is:

1. A device for protection of a communication installation against overvoltage and overcurrent, the device comprising:

a communication line leading from a disturbance side to a subscriber side, said disturbance side having a peak voltage that could accidentally short to said communication line from a power supply on said disturbance side, said subscriber side having a maximum operating voltage;

an overvoltage arrester connected between said communication line and a ground, said overvoltage arrester having a response voltage higher than said peak voltage of said power supply;

a voltage limiting component connected to said communication line between said overvoltage arrester and said subscriber side, said voltage limiting component having a response voltage slightly above said maximum operating voltage;

a PTC resistor connected in series with said communication line and between said overvoltage arrester and said voltage limiting component, said PTC resistor blocking said peak voltage.

2. A device in accordance with claim 1, wherein:

said PTC resistor has a switching current value capable of decoupling said voltage limiting component from said peak voltage.

3. A device in accordance with claim 1, wherein:

said voltage limiting component is a solid-state thyristor diode.

4. A device in accordance with claim 1, wherein:

said voltage limiting component has a response time faster than a response time of said overvoltage surge arrester.

5. A device in accordance with claim 1, wherein:

said response voltage of said voltage limiting component is less than said peak voltage.

6. A device in accordance with claim 1, wherein:

said voltage limiting component defines a fine protection device and said overvoltage arrester defines a coarse protection device, thereby providing a series protection device consisting of a coarse protection device and a fine protection device.

7. A device in accordance with claim 1, wherein:

a measuring and disconnecting position is connected in said communication line on said subscriber side of said voltage limiting component.

8. A device in accordance with claim 1, wherein:

another communication line extends from said disturbance side to said subscriber side;

another overvoltage arrester is connected between said another communication line and said ground, said another overvoltage arrester having a response voltage higher than said peak voltage of said power supply;

another voltage limiting component connected to said another communication line between said another overvoltage arrester and said subscriber side, said another voltage limiting component having a response voltage slightly above said maximum operating voltage;

another PTC resistor connected in series with said another communication line and between said another overvoltage arrester and said another voltage limiting component, said another PTC resistor blocking said peak voltage.

9. A device in accordance with claim 8, wherein:

said overvoltage arrester and said another overvoltage arrester are combined into a 3-pole suppressor.

10. A method for protection of a communication installation against overvoltage and overcurrent, the method comprising the steps of:

providing a communication line leading from a disturbance side to a subscriber side;

determining a peak voltage that could accidentally short to said communication line from a power supply on said disturbance side;

connecting an overvoltage arrester between said communication line and a ground, said overvoltage arrester having a response voltage higher than said peak voltage of said power supply;

determining a maximum operating voltage of said communication line;

connecting a voltage limiting component to said communication line between said overvoltage arrester and said subscriber side, said voltage limiting component having a response voltage slightly above said maximum operating voltage of said communication line;

connecting a PTC resistor in line with said communication line and between said overvoltage arrester and said voltage limiting component, said PTC resistor blocking said peak voltage.

11. A method in accordance with claim 10, wherein:

said overvoltage arrester shorting to said ground any voltages from said disturbance side greater than said response voltage.

12. A method in accordance with claim 10, wherein:

said PTC resistor reduces amperage from said peak voltage to a non-damaging level for said voltage limiting components.

13. A method in accordance with claim 10, wherein:

said voltage limiting component is a solid-state thyristor diode.

14. A method in accordance with claim 10, wherein:

said voltage limiting component has a response time faster than a response time of said overvoltage surge arrester.

15. A method in accordance with claim 10, wherein:

said response voltage of said overvoltage arrester is higher than an a.c. load of 230 Veff and the PTC resistors block the maximum amplitudes of the power supply voltage of 230 Veff.

* * * * *